US009333473B2

(12) United States Patent
Auger et al.

(10) Patent No.: US 9,333,473 B2
(45) Date of Patent: May 10, 2016

(54) PROCESS FOR PREPARING PARTICLES WHICH HAVE A HYDROPHILIC CORE COATED WITH A HYDROPHOBIC POLYMERIC LAYER

(71) Applicant: Commissariat A L'Energie Atomique Et Aux Energies Alternatives, Paris (FR)

(72) Inventors: Aurélien Auger, Le Mans (FR); Olivier Poncelet, Grenoble (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 0 days.

(21) Appl. No.: 14/580,746

(22) Filed: Dec. 23, 2014

(65) Prior Publication Data

US 2015/0107793 A1    Apr. 23, 2015

Related U.S. Application Data

(63) Continuation of application No. PCT/FR2013/051729, filed on Jul. 17, 2013.

(30) Foreign Application Priority Data

Jul. 31, 2012    (FR) ...................... 12 57434

(51) Int. Cl.
| | |
|---|---|
| *D21H 17/07* | (2006.01) |
| *B01J 2/00* | (2006.01) |
| *B01J 13/02* | (2006.01) |
| *C09B 67/02* | (2006.01) |
| *D21H 17/20* | (2006.01) |
| *D21H 21/54* | (2006.01) |
| *C08K 5/06* | (2006.01) |
| *C08K 5/3492* | (2006.01) |
| *C08K 5/42* | (2006.01) |
| *D21H 17/04* | (2006.01) |
| *D21H 17/06* | (2006.01) |
| *D21H 17/09* | (2006.01) |
| *D21H 17/34* | (2006.01) |
| *D21H 17/35* | (2006.01) |

(52) U.S. Cl.
CPC .................. *B01J 2/003* (2013.01); *B01J 13/02* (2013.01); *C08K 5/06* (2013.01); *C08K 5/3492* (2013.01); *C08K 5/42* (2013.01); *C09B 67/0097* (2013.01); *D21H 17/04* (2013.01); *D21H 17/06* (2013.01); *D21H 17/07* (2013.01); *D21H 17/09* (2013.01); *D21H 17/20* (2013.01); *D21H 17/34* (2013.01); *D21H 17/35* (2013.01); *D21H 21/54* (2013.01)

(58) Field of Classification Search
USPC ........................................................ 162/168.7
IPC ............................... B01J 2/00; C08K 5/42,5/06
See application file for complete search history.

(56) References Cited

U.S. PATENT DOCUMENTS

| | | | |
|---|---|---|---|
| 2004/0232575 A1 | 11/2004 | Wulff et al. | |
| 2011/0027376 A1* | 2/2011 | Boey ...................... | A61K 9/107 424/499 |

FOREIGN PATENT DOCUMENTS

| | | |
|---|---|---|
| GB | 1 242 689 AI | 8/1971 |
| KR | 100 886 316 B1 | 3/2009 |
| WO | 03/015910 A1 | 2/2003 |
| WO | 2006/027328 A1 | 3/2006 |
| WO | 2006/048166 A1 | 5/2006 |
| WO | 2006/048169 A1 | 5/2006 |
| WO | 2009/075652 A1 | 6/2009 |

OTHER PUBLICATIONS

International Search Report (Application No. PCT/FR2013/051729) dated Nov. 6, 2013.

* cited by examiner

*Primary Examiner* — Mark Halpern
(74) *Attorney, Agent, or Firm* — Burr & Brown, PLLC

(57) ABSTRACT

This method of preparing particles having a hydrophilic core coated with a hydrophilic core coated with a hydrophobic polymeric layer includes the steps of: preparing an aqueous phase comprising at least one hydrophilic optical brightener or colorant; preparing an organic phase including at least one hydrophobic polymer; forming a water-in-oil inverse emulsion by adding the aqueous phase into the organic phase; forming the particles by thermal quenching of the emulsion; and isolating the particles thus obtained.

15 Claims, 1 Drawing Sheet

PROCESS FOR PREPARING PARTICLES WHICH HAVE A HYDROPHILIC CORE COATED WITH A HYDROPHOBIC POLYMERIC LAYER

BACKGROUND OF THE INVENTION

1. Field of the Invention

The invention relates to the encapsulation of hydrophilic compounds, and more specifically to a method of preparing particles having a hydrophilic core coated with a hydrophobic polymeric layer.

The fields of use of the present invention particularly include the paper industry, the textile industry, printing, the pharmaceutical industry, or plastics engineering.

2. Description of Related Art

The protection by encapsulation of chemical compounds and particularly of hydrophilic compounds enables to control or to modify the properties thereof It is thus possible to predetermine the conditions of release of an active principle, to lengthen the lifetime of a product by protecting it from external elements, but also to improve the dispersibility of a compound.

For example, in the paper industry, except for cellulose fibers, most of the components (such as colorants, optical brighteners or active principles) used are water-soluble. Since paper manufacturing processes are essentially carried out in an aqueous environment, it is thus particularly difficult to incorporate water-soluble compounds. Indeed, the fibers forming the sheet of paper can only partially retain such water-soluble compounds. Accordingly, this generates considerable losses and requires a system of continuous recirculation of aqueous solutions of optical brighteners and colorants.

Further, at the end of the impregnation, waste waters contain a significant amount of optical brighteners or of colorants and thus should be submitted to a special new treatment.

On the other hand, it is almost impossible to accurately control the quantity of optical brighteners or of colorants impregnated on paper. Whitenesses or colorant shades may thus differ from one impregnation to another.

To overcome such issues of solubility and of lack of interaction between optical brighteners and fibers, new less water-soluble agents have been developed. Although it is relatively satisfactory, such a solution has the disadvantage of limiting the range of selectable optical brighteners, which are furthermore expensive than fully water-soluble agents.

Accordingly, there is a technological need for a method enabling to decrease, or even to suppress losses of optical brighteners and of colorants, as well as to accurately know the deposited quantities.

The present invention enables to solve prior art problems particularly relative to the retention of conventional optical brighteners or colorants in paper manufacturing processes. The method developed by the Applicant enables to prepare particles by coating of hydrophilic compounds with a hydrophobic polymeric layer.

SUMMARY OF THE INVENTION

The method forming the object of the present invention enables to prepare spherical nanoparticles and microparticles containing in their core one or a plurality of hydrophilic compounds. Such particles thus have the properties of the encapsulated hydrophilic compound (fluorescence, coloring power . . . ) but also the properties of the polymer(s) forming the polymeric layer coating them (solubility, oxygen barrier, UV barrier . . . ).

It is thus possible to modulate at will the particle properties by varying the nature of the hydrophilic compounds and of the polymer(s).

The particles can thus be made hydrophobic and dispersible in an aqueous or organic medium.

The encapsulation may also have other remarkable advantages according to the nature of the polymer forming the capsule. As already mentioned, the polymeric layer coating the particles may in particular protect them against the UV aging of the encapsulated compound.

More specifically, the present invention relates to a method of preparing particles having a hydrophilic core coated with a hydrophobic polymeric layer, comprising the steps of:

preparing an aqueous phase comprising at least one hydrophilic compound;

preparing an organic phase comprising at least one hydrophobic polymer;

forming a water-in-oil inverse emulsion by adding the aqueous phase into the organic phase;

forming the particles by thermal quenching of the emulsion;

isolating the particles thus obtained.

The particle core is entirely or partly formed of at least one hydrophilic compound (optical brighteners, colorants). The external layer of the particles is formed by means of at least one hydrophobic polymer.

Water-in-oil inverse emulsion means an emulsion having an aqueous phase as a minority phase and an organic phase as a majority phase. The aqueous phase is dispersed in the organic phase.

The aqueous phase comprises at least one hydrophilic compound mostly being in solute state in the aqueous phase.

Further, the hydrophilic compound is advantageously very insoluble, or even totally insoluble, in the majority organic solvent of the organic phase.

According to a specific embodiment of the invention, the aqueous phase may comprise water and/or at least one water-soluble solvent such as, for example, methanol, ethanol, or THF. Said water-soluble solvent has water miscibility properties so that the aqueous phase is homogeneous. The hydrophilic being in the solute state in the aqueous phase, it is advantageously soluble in the at least one water-soluble solvent.

Further, the so-called aqueous phase is advantageously immiscible with the organic phase.

Advantageously, the hydrophilic compound concentration in the aqueous phase may be in the range from 1 to 50% by weight with respect to the weight of the aqueous phase, more advantageously still from 5 to 10% by weight.

The hydrophilic compound may be an optical brightener (used to improve the whiteness of papers) or a colorant. It may particularly be selected from the group comprising 4,4'-bis (2-benzoxazolyl)-stilbene; 2,5-bis(5-tert-butyl-2-benzoxazolyl)-thiophene; Blancophor UWS; Blancophor P01; 7-hydroxy-4-methylcoumarin; 7-diethylamino-4-methylcoumarin; Fluorescent Brightener 28 (FB28), and mixtures thereof.

Fluorescent Brightener 28 (FB28), having CAS number 4404-43-7, corresponds to the following formula, $C_{40}H_{44}N_{12}O_{10}S_2$:

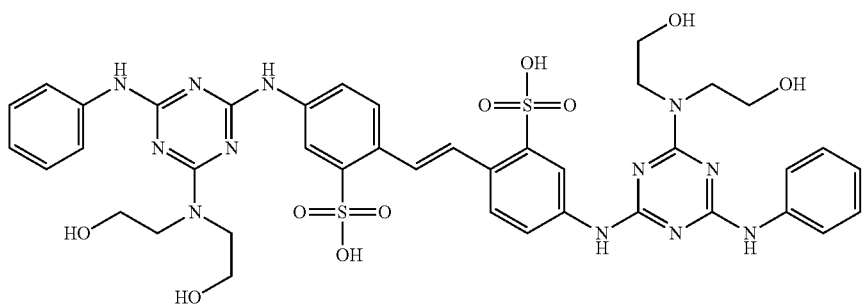 [SMILES: O=S(=O)(O)c1cc(Nc2nc(Nc3ccccc3)nc(N(CCO)CCO)n2)ccc1/C=C/c1ccc(Nc2nc(Nc3ccccc3)nc(N(CCO)CCO)n2)cc1S(=O)(=O)O]

The organic phase comprises at least one organic solvent which may be selected from the group comprising cyclohexane, toluene, p-xylene, dichloromethane, gamma nonalactone, and mixtures thereof.

The organic phase further comprises at least one hydrophobic polymer.

Advantageously, the hydrophobic polymer concentration in the organic phase is in the range from 2 to 10% by weight with respect to the weight of the organic phase, more advantageously still from 4 to 8% by weight.

The hydrophobic polymer capable of being implemented in the context of the present invention may be particularly selected from the group comprising the following compounds (CAS number):
- polyethylene 40 stearate (9004-99-3);
- poly(vinylidene chloride-co-vinyl chloride) (9011-06-7);
- poly(styrene-co-maleic anhydride) (26762-29-8 and 9011-13-6);
- polyvinylpyrrolidone (9003-39-8);
- poly(vinyl butyral-co-vinyl alcohol-co-vinyl acetate) (27360-07-2);
- poly(maleic anhydride-act-1-octadecene) (25266-02-8);
- poly(vinyl chloride) (9002-86-2);
- PEOX poly-(2-ethyl-2-oxazoline) (25805-17-8)
- PLGA (poly(lactic-co-glycolic acid));
- mixtures thereof.

Hydrophobic polymers capable of being used in the context of the method forming the object of the invention may advantageously have a molecular weight greater than 9,000 g/mol.

Further, advantageously, the external layer of the particles is not crosslinked.

The method forming the object of the invention further comprises a step of preparing an inverse emulsion, wherein the organic and aqueous phases may advantageously be mixed in the presence of at least one surface active agent.

According to this specific embodiment, the organic phase may comprise at least one surface active agent.

The surface active agent is advantageously solubilized in the organic phase and prior to the forming of the water-in-oil inverse emulsion, particularly to avoid possible problems of solubilization kinetics.

The surface active agent concentration in the organic phase is preferably in the range from 0 to 1 mol/L, more advantageously in the order of 0.1 mol/L.

The surface active agent may particularly be selected from the group comprising AOT (dioctyl sulfosuccinate sodium salt), Igepal® CO 520, Triton® X100, hexanol, sodium dodecyl sulfate, and mixtures thereof.

According to a preferred embodiment, the surface active agent is a mixture of non ionic/anionic surface active agents, particularly an AOT/Igepal® CO 520 mixture advantageously having a 60/40 molar ratio.

Igepal® CO 520, having CAS number 68412-54-4, corresponds to the compound having the following formula:

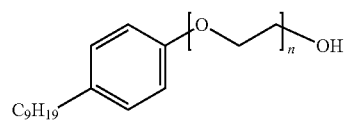

n being an integer advantageously in the range from 0 to 40.

Triton® X100, having CAS number 9002-93-1, corresponds to the compound having the following formula:

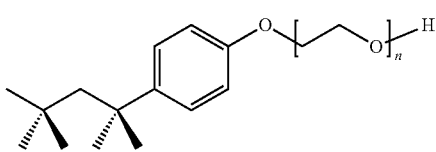

n being an integer advantageously in the range from 0 to 20.

According to another specific embodiment, the aqueous phase may comprise at least one surface active agent.

The water-in-oil inverse emulsion may advantageously be formed by slowly adding, generally by a drip system, and advantageously under a strong stirring, the aqueous phase to the organic phase.

The stirring, generally mechanical, is advantageously extended by a delay sufficient to obtain the emulsion in stabilized form.

The inverse emulsion is formed according to conventional techniques known by those skilled in the art.

As already mentioned, once the emulsion has been obtained, the method according to the invention further comprises a particle-forming step.

This step is advantageously carried out by thermal quenching of the emulsion. The emulsion thus has to be exposed to a temperature enabling to set the droplets of the emulsion in the state of particles. The thermal quenching is preferably carried out at a temperature in the range from −200 to −220° C., more advantageously still from −205 to −210° C. The particle forming is generally instantaneous.

According to an advantageous embodiment, the particles are formed by pouring the emulsion, advantageously with a drip system, into liquid nitrogen.

The particles thus obtained may then be isolated, particularly by filtering.

After their forming, the particles may be freeze-dried, especially to totally or partly remove the residual organic solvents and water.

Isolated particles may thus have less than 10% by weight, with respect to the particle weight, of organic solvent and water.

The present invention also relates to particles obtained by implementing the above-described method. They advantageously have a spherical shape and an average diameter advantageously smaller than 5 micrometers, and more advantageously still smaller than 1 micrometer.

According to a specific embodiment of the invention, the particles may cumulate the roles of fluorescent compound and of carrier (compound enabling to exacerbate the fluorescence of a compound).

A carrier may particularly improve the efficiency of OBAs (Optical Brightening Agents) used in paper manufacturing, and thus increase the whiteness of papers.

According to a specific embodiment, the hydrophobic polymer has carrier properties.

The hydrophobic polymer may also progressively degrade in contact with water. Such is especially the case for PLGA, poly(lactic-co-glycolic acid). It is then possible to control the hydrophilic compound release speed. This type of polymer is thus adapted to particles usable in the pharmaceutical industry, particularly for the encapsulation and the release of an active principle at controlled speed in the stomach.

The particles forming the object of the present invention may be used in many technical fields, particularly due to the properties of the hydrophilic compound and of the hydrophobic coating. The fields of interest particularly include the paper industry, the textile industry, printing, the pharmaceutical industry, or plastics engineering. The particles may thus be used as textile colorants, optical brighteners and colorants in the paper industry, in printing inks, for example.

The particles considered according to the invention can be easily dispersible in organic solvents (solvents capable of solubilizing the initial hydrophobic polymer). However, their dispersibility in water may require very strong shear rates—for example, by UltraTurax stirring.

The present invention also relates to a paper manufacturing method using the particles obtained according to the above-described method. The particles may particularly be integrated in the cellulosic suspension, or by deposition (coating on the sheet once formed).

The present invention also relates to a method of treating the cellulosic suspension used in a paper manufacturing method, by introducing into the cellulosic suspension at least one type of particles such as described hereabove.

The particles may thus be integrated in the cellulosic suspension, that is, in situ, during the paper manufacturing. They may also be introduced by coating on the paper once it has been manufactured.

Thus, optical brightener or colorant losses may be decreased, or even non-existent. Indeed, the size of the particles and their low hydrosolubility allow them to be retained by the paper fibers. Advantageously, after impregnation, aqueous optical brightener or colorant solutions contain no more particles and thus require no new treatment.

The quantity of optical brighteners or of colorants on the paper can thus be controlled. Accordingly, the whitenesses and color shades are always perfectly similar and reproducibility issues are solved.

As already mentioned, according to the method forming the object of the invention, the polymeric layer coating the particles may in particular protect them against the UV aging of the encapsulated compound. This may be particularly advantageous in the case of colorants and optical brighteners used in paper manufacturing and which may have a high UV sensitivity. Their UV aging may indeed result in degrading the paper properties, optical brighteners losing their initial whiteness to become yellowish. Similarly, the shade of a colored paper may rapidly fade and thus lose its brightness due to UV aging.

The particles according to the invention can thus considerably lengthen the product lifetime. For example, the degradation kinetics of a fluorophore or of a colorant may be slowed down or annihilated, particularly by using as a hydrophobic polymer an oxygen barrier polymer.

The invention and the resulting advantages will better appear from the following non-limiting drawings and examples, provided as an illustration of the invention.

DETAILED DESCRIPTION OF THE INVENTION

EXAMPLE 1

Figure 1:
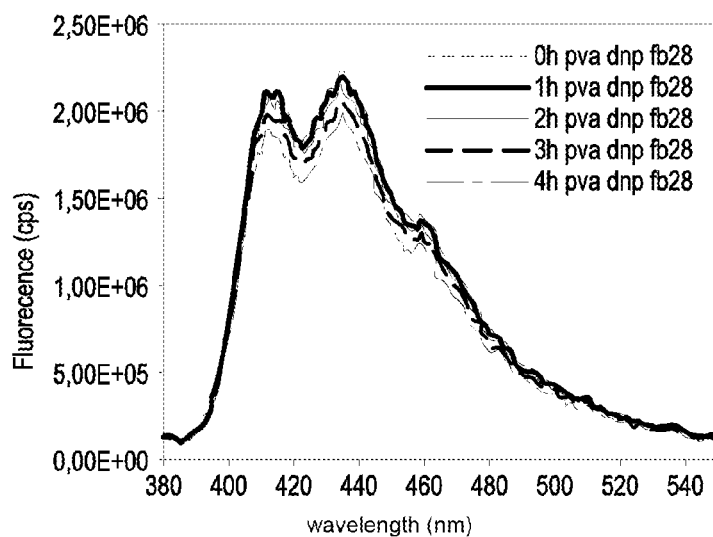
FIG. 1 illustrates the aging of FB28 particles coated in a PVA matrix according to the method forming the object of the invention, by measurement of the fluorescence according to the wavelength.

Particles are prepared by implementing the method forming the object of the invention. An organic phase comprising the following compounds is prepared:
100 mL of a cyclohexane solution;
polystyrene (Mw=35,000);
4.0 g of AOT.

The polystyrene concentration is 5% by weight with respect to the weight of the organic phase.

An aqueous phase comprising the following compounds is prepared:
water;
an optical brightener (Fluorescent Brightener 28 or Blancophor P01)

The optical brightener concentration is 5% by weight with respect to the weight of the aqueous phase. The total weight of the aqueous phase is 0.65 g.

In a beaker containing the organic phase under a strong stirring, the aqueous phase is added by a drip system, at ambient temperature.

The stirring is maintained for 30 minutes so that the emulsion homogenizes.

The emulsion thus obtained is then introduced by a drip system into liquid nitrogen to set the droplets in the state of particles.

All the particles thus obtained are then filtered and freeze-dried by means of a freeze drier or of a Schlenk tube maintained under dynamic vacuum by a vane pump and provided with a cold trap for 24 hours.

The powder thus obtained easily disperses back into certain organic solvents (those allowing the stabilization of the hydrophobic polymer) but does not easily disperse in water.

EXAMPLE 2

Particles are prepared by implementing the method forming the object of the invention.

An organic phase comprising the following compounds is prepared:
- 100 mL of p-xylene;
- poly(styrol-co-malein-)anhydrid (Mw=35,000);
- 2.6 g of AOT and 1.76 g of IGEPAL® CO 520.

The poly(styrol-co-malein-)anhydrid concentration is 5% by weight with respect to the weight of the organic phase.

An aqueous phase comprising the following compounds is prepared:
- water;
- an optical brightener (Fluorescent Brightener 28 or Blancophor P01).

The optical brightener concentration is 5% by weight with respect to the weight of the aqueous phase. The total weight of the aqueous phase is 18 g.

In a beaker containing the organic phase under a strong stirring, the aqueous phase is added by a drip system, at ambient temperature.

The stirring is maintained for 30 minutes so that the emulsion homogenizes.

The emulsion thus obtained is thus introduced by a drip system into liquid nitrogen to set the droplets in the state of particles. The assembly is then filtered and freeze-dried by means of a freeze drier or of a Schlenk tube maintained under dynamic vacuum by a vane pump and provided with a cold trap for 24 hours.

The powder thus obtained easily disperses back into certain organic solvents (those allowing the stabilization of the hydrophobic polymer) but does not easily disperse in water.

UV Resistance Test

To test the resistance to UV aging of the particles obtained by implementation of the method forming the object of the invention, a solution containing 2 g of PVA (poly-vinyl alcohol) at 10% by weight and 0.5 g of particles has been prepared.

After UltraTurax stirring for 5 minutes, this solution is deposited on a sheet of paper (wet thickness 60 micrometers).

The sheet of paper is then submitted to an aging test in an ATLAS Suntest chamber.

The aging conditions are the following:
- irradiance at 765 W/m$^2$;
- xenon arc lamp equipped with a so-called "sheet glass" filter which cuts off UV radiations below 310 nanometers,
- exposure time: 6 hours.

At the end of this aging test, the sample appears not to have aged (intact whiteness) while a sample containing the same optical brightener but which has not been obtained according to the method of the present invention, has a lesser whiteness (yellowing).

These tests show the improvement of the resistance of optical brightener particles to UV aging.

Figure 2:
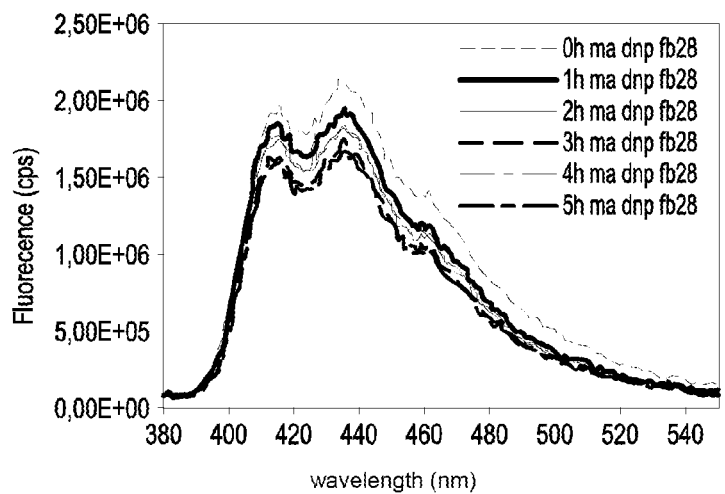
FIG. 2 illustrates the aging of FB28 particles coated in a starch matrix according to the method forming the object of the invention, by measurement of the fluorescence according to the wavelength.
Figure 3:
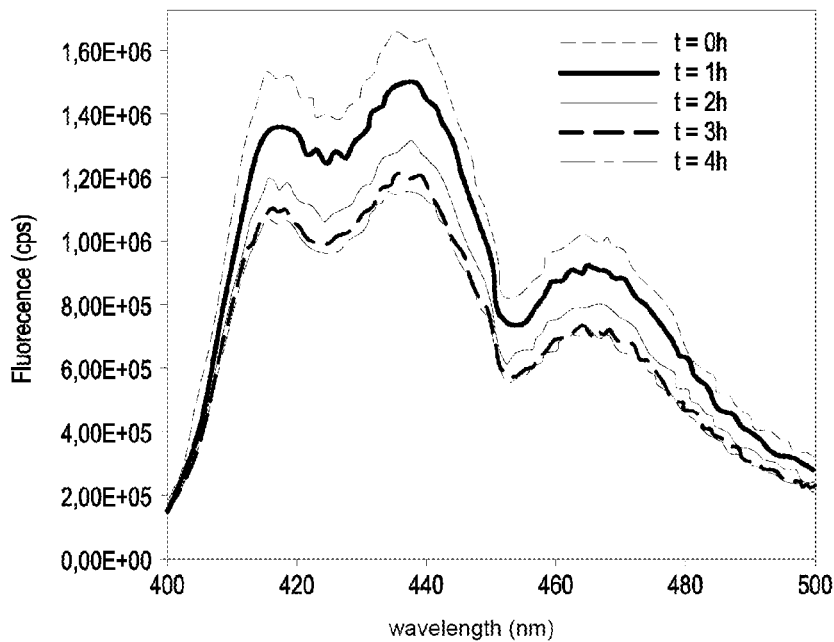
FIG. 3 illustrates the aging of Blancophor P01 particles coated in a PVA matrix according to the method forming the object of the invention, by measurement of the fluorescence according to the wavelength.

The tested particles are the following:
- particles of FB28 nanopigments coated with PVA (FIG. 1—very moderate aging);
- particles of FB28 nanopigments coated with starch (FIG. 2—slowed aging);
- particles of Blancophor P01 nanopigments coated with PVA (FIG. 3—slowed aging);

The particles obtained according to the method forming the object of the present invention have a better resistance to UV radiations of the fluorescent compound and thus of the product in which it is incorporated.

The invention claimed is:

1. A method for preparing particles having a hydrophilic core coated with a hydrophobic polymeric layer, comprising the steps of:
   preparing an aqueous phase comprising at least one hydrophilic optical brightener or colorant;
   preparing an organic phase comprising at least one hydrophobic polymer;
   forming a water-in-oil inverse emulsion by adding the aqueous phase into the organic phase;
   forming the particles by thermal quenching of the emulsion; and
   isolating the particles thus obtained.

2. The particle preparation method of claim 1, wherein the hydrophilic compound concentration in the aqueous phase is in a range from 1 to 50% by weight with respect to the weight of the aqueous phase.

3. The particle preparation method of claim 2, wherein the hydrophilic compound concentration in the aqueous phase is in a range from 5 to 10% by weight with respect to the weight of the aqueous phase.

4. The particle preparation method of claim 1, wherein the hydrophobic polymer concentration in the organic phase is in a range from 2 to 10% by weight with respect to the weight of the organic phase.

5. The particle preparation method of claim 4, wherein the hydrophobic polymer concentration in the organic phase is in a range from 4 to 8% by weight with respect to the weight of the organic phase.

6. The particle preparation method of claim 1, wherein the particle isolation comprises a freeze drying step.

7. The particle preparation method of claim 1, wherein the particles have an average diameter smaller than 5 micrometers.

8. The particle preparation method of claim 7, wherein the particles have an average diameter smaller than 1 micrometer.

9. The particle preparation method of claim 1, wherein the hydrophilic compound is selected from the group consisting of:
   4,4'-bis(2-benzoxazolyl)-stilbene;
   2,5-bis(5-tert-butyl-2-benzoxazolyl)-thiophene;
   7-hydroxy-4-methylcoumarin;
   7-diethylamino-4-methylcoumarin;
   the compound corresponding to CAS number 4404-43-7; and mixtures thereof.

10. The particle preparation method of claim 1, wherein the hydrophobic polymer is selected from the group consisting of:
    polyethylene 40 stearate;
    poly(vinylidene chloride-co-vinyl chloride);
    poly(styrol-co-malein-)anhydrid;
    polyvinylpyrrolidone;
    poly(vinyl butyral-co-vinyl alcohol-co-vinyl acetate);
    poly(maleic anhydride-act-1-octadecene);
    poly(vinyl chloride);
    PEOX poly-(2-ethyl-2-oxazoline);
    PLGA (poly(lactic-co-glycolic acid)); and mixtures thereof.

11. The particle preparation method of claim 1, wherein the organic phase further comprises a surface active agent.

12. The particle preparation method of claim 11, wherein the surface active agent is selected from the group consisting of dioctyl sodium sulfosuccinate salt, the compound corresponding to CAS number 68412-54-4, the compound corresponding to CAS number 9002-93-1, hexanol, sodium dodecyl sulfate, and mixtures thereof.

13. The particle preparation method of claim 1, wherein the thermal quenching of the emulsion is performed by pouring the emulsion, with a drip system, into liquid nitrogen.

14. Particles having a hydrophilic optical brightener core coated with a hydrophobic polymeric layer, obtained according to the method of claim 1.

15. A method of treating the cellulosic suspension used in a paper manufacturing method, by introducing into a cellulosic suspension the particles of claim 14.

* * * * *